May 26, 1959 F. J. RATTI 2,888,281
SELF-COMPENSATING SEAL
Filed Jan. 23, 1957 2 Sheets-Sheet 1
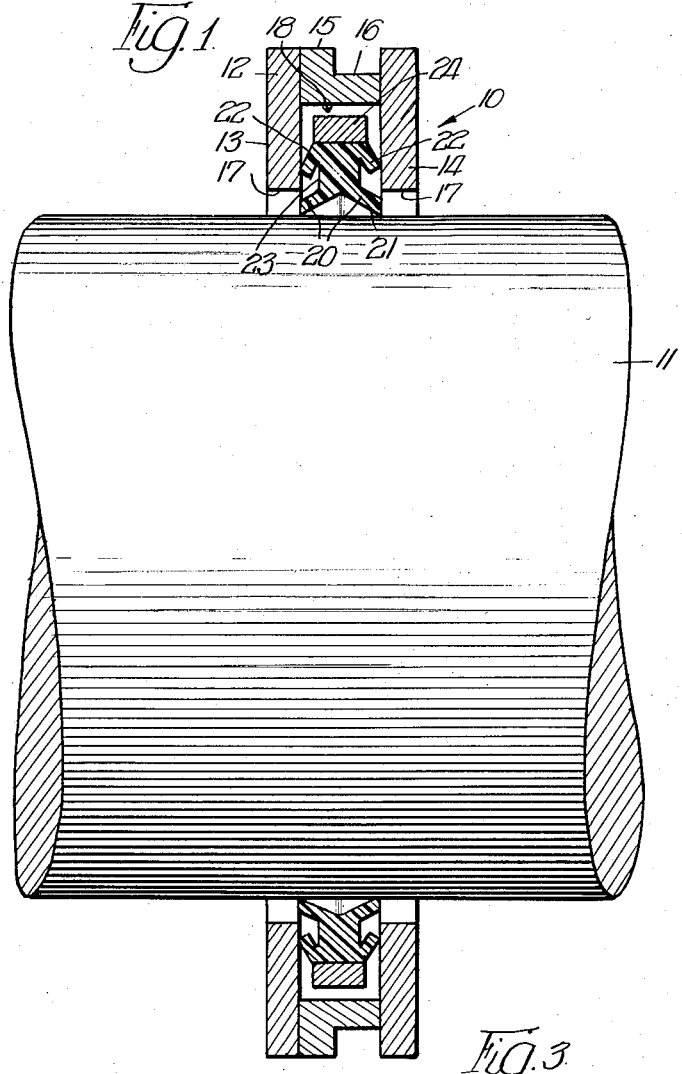
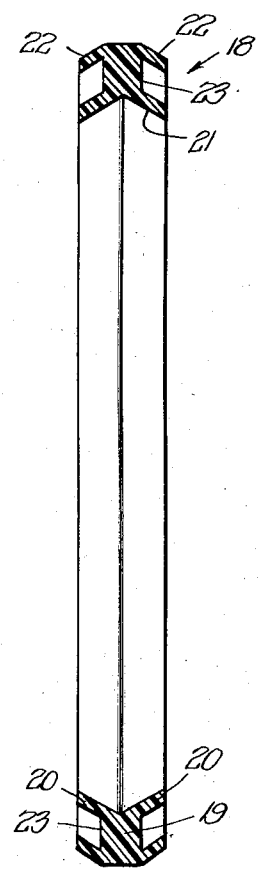
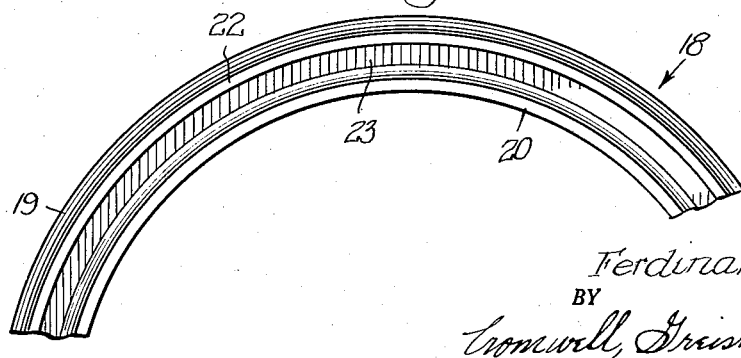
INVENTOR.
Ferdinand J. Ratti,
BY
Cromwell, Greist & Warden
Attys.

May 26, 1959 F. J. RATTI 2,888,281
SELF-COMPENSATING SEAL
Filed Jan. 23, 1957 2 Sheets-Sheet 2
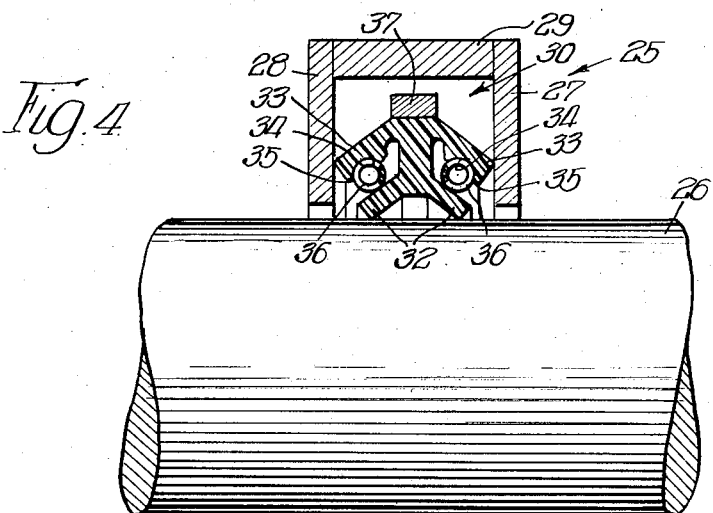
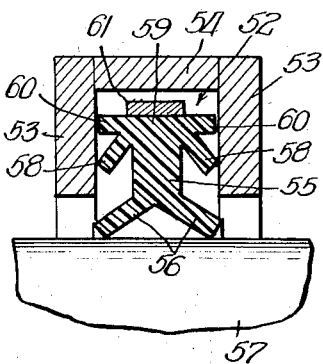
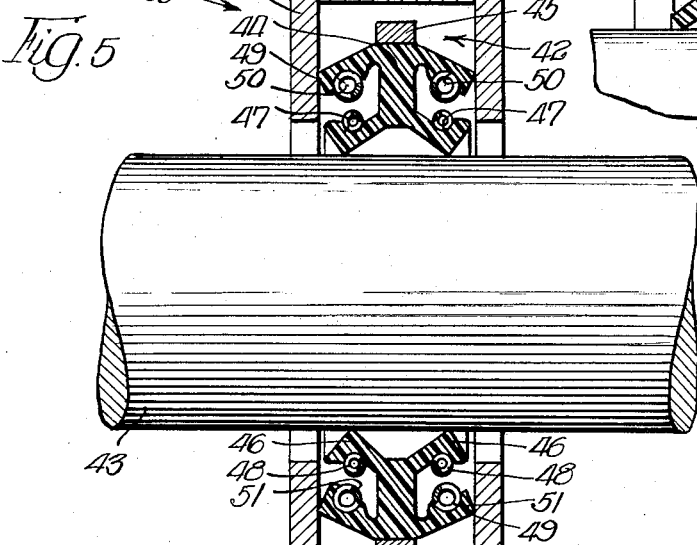
INVENTOR.
Ferdinand J. Ratti,
BY
Cromwell, Greist & Warden
Attys.

United States Patent Office 2,888,281
Patented May 26, 1959

2,888,281

SELF-COMPENSATING SEAL

Ferdinand J. Ratti, Far Hills, N.J., assignor to Chicago Rawhide Manufacturing Company, Chicago, Ill., a corporation of Illinois Application January 23, 1957, Serial No. 635,784

13 Claims. (Cl. 286—11.11)

The present invention relates generally to a new and improved self-compensating seal particularly adapted for use with rotatable members. More specifically, the new and improved seal of the present invention is particularly adapted for use in sealing a high speed shaft, the seal utilizing centrifugal and frictional forces to automatically compensate for changes in shaft speed operation to provide efficient long-life sealing action.

It is an object of the present invention to provide a new and improved self-compensating seal particularly adapted for use with rotatable shafts operated at high speeds, the sealing member providing both end-face and shaft-sealing functions which are automatically varied in response to the speed of shaft operation by utilizing centrifugal and frictional forces rather than combating these forces.

Another object is to provide a new and improved fluid-tight shaft seal of uncomplicated design which incorporates the use of a seal housing fixedly mounted in the bore of the housing of a shaft against rotation with the shaft, the seal housing having partially received therein a new and improved sealing member which seals the shaft relative to its housing during operation of the same at any speed and which is particularly adapted for efficient sealing function during the operation of the shaft at high speeds, the sealing member being provided with flexible sealing lips which provide a shaft seal and an end-face seal with respect to the seal housing, each of the sealing actions being self-compensating in response to operational speeds of the shaft to provide fluid-tight sealing action at all times without excessive wear or damage by frictional forces thereby adapting the sealing member for extended trouble-free use.

Still another object, taken in conjunction with the foregoing, is to provide a sealing member carrying spaced pairs of circumferentially continuous flexible lips, the innermost pair adapted for self-compensating frictional sealing engagement with a rotatable shaft, the outermost pair being adapted for self-compensating end-face frictional engagement with a fixedly mounted seal housing, the sealing member being rotatable to a degree with the shaft to thereby maintain the shaft sealing lips in sealing engagement with the shaft under all operational speeds and the end-face sealing lips in movable sealing engagement with the seal housing, the pairs of sealing lips being so arranged as to function in response to centrifugal force developed by the rotation of the sealing member to compensate the sealing action provided thereby in line with rotational speeds of the shaft to maintain fluid-tight sealing action while reducing wear attending high speed operation.

Other objects not specifically set forth will become apparent from the following detailed description made in conjunction with the drawings wherein:

Fig. 1 is a vertical section of the new and improved seal of the present invention illustrating its operative relation with a fragmentarily shown shaft;

Fig. 2 is a vertical section of the new and improved sealing member of the seal of the present invention;

Fig. 3 is a fragmentary side elevation of the sealing member of Fig. 2;

Fig. 4 is a vertical section of a modified form of seal;

Fig. 5 is a vertical section of still another modification; and

Fig. 6 is a vertical section of a further modification particularly adapted for use in pressure sealing applications.

Referring to Fig. 1, a seal 10 is shown mounted in its operative relation with respect to a shaft 11, the shaft being suitably mounted in a bore of a shaft housing of known type which for purposes of simplification has not been illustrated. The seal 10 is provided with a seal housing 12 formed from flat rings 13 and 14 which define the radial side walls of the annular housing 12 and which are interconnected near their outer ends by an axially extending ring 15. The outer rear wall of the housing 12, as defined by the axial ring 15, is provided with an annular groove 16 which receives a retaining ring (not shown) or other suitable means, capable of fixedly securing the seal housing 12 in the bore of the shaft housing carrying the shaft 11. The seal housing 12 is mounted within the bore of the shaft 11 against rotation with the shaft 11 and the innermost axially extending edges 17 of the side walls 13 and 14 are well spaced from the outer periphery of the shaft 11 to provide operational clearance therebetween.

The seal housing 12 is U-shaped in cross section and opens inwardly toward the shaft 11. Partially received within the interior of the seal housing 12 is a sealing member generally designated by the numeral 18. As particularly shown in Figs. 2 and 3, the sealing member 18, when in its unconfined condition as by being unmounted in the seal housing 12, is in the form of an annular ring and includes a circumferentially continuous block-like body portion 19 of substantial mass. The innermost surface of the body portion 19 is provided with integral divergent sealing lips 20 each of which is directed outwardly from the body portion 19 in opposite directions with respect to one another and inwardly toward the center of the sealing member 18. The sealing lips 20 are flexible relative to the body portion 19 and the innermost surfaces of the same converge to provide the inner surface of the sealing member 18 with a V-shaped contour 21.

Spaced outwardly from the sealing lips 20 are circumferentially continuous sealing lips 22 which are divergently directed outwardly from the body portion 19 and inwardly toward the center of the sealing member 18. The lips 22 are integrally formed with the body portion 19 and are of a width providing the same with flexibility relative to the body portion 19. The lips 22 extend from opposite side faces of the body portion 19 near the outer surface of the same. The associated lips 20 and 22 carried on each of the side faces of the body portion 19 are in substantially parallel relation and define therebetween an outwardly opening circumferentially continuous groove 23.

The sealing member 18 may be formed from any suitable material which exhibits the requisite resilient properties and friction characteristics. It has been found desirable to utilize "Teflon," which is a tetrafluoroethylene polymer manufactured by E. I. du Pont de Nemours & Company of Wilmington, Delaware, in forming the sealing member 18. Still further, it has been found preferable to impregnate the "Teflon" ring with glass and graphite particles. The glass increases the operating temperature of the "Teflon" ring and the graphite aids in overcoming the abrasive action of the glass. The glass particles further reduce the cold flow properties of the "Teflon" ring.

In mounting the sealing member 18 in the seal housing 12, a metallic constriction ring 24 is applied to the outer surface of the sealing member 18 to retain the desired shape of the member during operation of the same. The combined sealing member 18 and constriction ring 24 are inserted in the interior of the seal housing 12, as shown in Fig. 1, and in doing so the outermost sealing lips 22 are compressed against the inner radial surfaces of the side walls 13 and 14. The diameter of the sealing member 18 is such that it is only partially received in the seal housing 12 and the sealing lips 20 remain inwardly beyond the inner surfaces 17 of the rings 13 and 14. Upon insertion of the shaft 11 through the seal 10 the outermost edges of the sealing lips 20 are placed in frictional sealing engagement with the outer periphery of the shaft 11. The sealing fingers 20 provide a shaft-sealing function with respect to the radially directed inner surfaces of the side walls 13 and 14 of the seal housing 12.

The seal 10, while being adapted for use in any type of operation utilizing a rotatable shaft, is particularly adapted for high speed shaft operation. Due to the manner in which the sealing member 18 floats in its housing and is not fixed relative thereto, the seal 10 can adjust to any reasonable amount of bore or shaft misalignment. As may be readily appreciated, this adjustment feature is of major importance in many applications.

Upon rotation of the shaft 11 the sealing member 18, due to the frictional engagement existing between the lips 20 and the shaft 11, rotates with the shaft within the seal housing 12. The sealing lips 22 being compressed within the seal housing 12 frictionally engage the opposed inner surfaces of the side walls 13 and 14 and establish a rotational or moving end-face seal therewith. As the rotational speed of the shaft 11 increases the rotational speed of the sealing member 18 also increases until centrifugal force developes to an extent that the biasing strength of the material forming the lips 20 is at least slightly overcome and slippage occurs. Consequently, the lips 20 being flexible relative to the body portion 19 are flexed slightly away from the shaft 11 so as to reduce the frictional forces developed therebetween and the rotational speed of the sealing member 18 is reduced as a result of slippage. The sealing member 18 then rotates at an intermediate speed and wear of the sealing member 18 is reduced in conformance with a reduction in frictional forces. As an example of an intermediate speed of rotation of the sealing member 18, the speed of the shaft 11 may be 8,000 r.p.m. while the sealing member 18 rotates at between 3,500 and 4,000 r.p.m. This type of operation materially reduces the wear of the material of the sealing member 18 and the life of operation of the same is materially increased. Also there is no danger of the member 18 burning out.

The inner diameter of the sealing member 18 as defined by the lips 20 is controlled so as to create greater frictional forces between the lips 20 and the shaft 11 than those existing between the lips 22 and the inner surfaces of the housing walls 13 and 14. Consequently, the sealing member 18 will rotate with the shaft 11 until the frictional force between the lips 20 and the shaft 11 is reduced by the action of centrifugal force to an extent that it equals the frictional force developed between the lips 22 and the inner surfaces of the side walls 13 and 14. When the rotational speed of the sealing member 18, as controlled by the speed of rotation of the shaft 11, produces sufficient centrifugal force to equalize these frictional forces, an increase in shaft velocity will not appreciably affect the velocity of the member 18. Once the frictional forces of the lips 22 exceed those of the lips 20 the sealing member 18 will cease to rotate with the shaft 11. This latter feature materially aids in providing the seal 10 with long-life operation.

Due to the arrangement of the sealing lips 20 and 22, the centrifugal force developed by rotation of the sealing member 18 acts on both the lips 20 and 22 to decrease the frictional engagement between the sealing member 18 and the shaft 11 and increase the frictional engagement between the sealing lips 22 and the housing side walls 13 and 14. Consequently, the centrifugal force acts to reduce shaft-sealing friction while simultaneously increasing end-face sealing friction. However, it should be understood that the sealing lips 20 are maintained at all times in sealing engagement with the shaft 11 and that the centrifugal force acts merely to reduce the frictional forces developed between the sealing lips 20 and the shaft 11. Thus the design of the sealing member 18 and its association with the seal housing 12 provides a self-compensating seal 10 which is capable of preventing leakage of high pressure fluids, of uncomplicated low cost design and capable of long-life efficient operation.

While the self-compensating seal of the present invention has been referred to as being formed from "Teflon," it should be understood that any suitable resilient material such as rubber or synthetic rubber may be readily used. In the instance where a rubber sealing element is used in high temperature operation, extended use may result in loss of resiliency due to the setting as a result of high temperature action. In order to overcome this tendency the self-compensating seal of the present invention may be slightly modified in its structure to be provided with separate biasing elements which impart to the sealing lip portions the requisite flexibility or resiliency.

Figs. 4 and 5 illustrate different modified uses of coil springs in loading the flexible lips. While the use of the coil springs is of particular importance in the event of high temperature operation, it should be understood that the seals may be initially designed and manufactured with the purpose in mind of relying at all times on the resilient functioning of the coil springs. In this respect the coil springs may be relied upon in providing the requisite resiliency to the material of the seal and quality control, size or thickness of the elements of the seal may be varied considerably.

In Fig. 4 a sealing unit 25 is illustrated as being operatively mounted relative to a shaft 26. The unit 25 includes a housing formed from rings 27 and 28 which define the radial side walls of the housing and which are interconnected near their outer peripheries by an axially extending ring 29. The housing is suitably held within the bore of a shaft housing (not shown) and is fixed thereby against rotation with the shaft 26 while being maintained in spaced relation thereto. A sealing member 30 is received within the housing and is formed from an annular block-like body portion 31, the innermost surface of which is provided with integral divergent sealing lips 32 each of which is directed outwardly from the body portion 31 in opposite directions with respect to one another and inwardly toward the shaft 26.

Spaced outwardly from the sealing lips 32 are circumferentially continuous sealing lips 33 which are divergently directed outwardly from the body portion 31 and inwardly toward the center of the sealing member 30. The innermost surfaces of the lips 33 are provided with grooves 34 defined by circumferentially continuous ridges 35 between which are received endless coil springs 36. The springs 36 are of an expandable nature being mounted in a compressed state within the grooves 34. Thus the springs urge the sealing lips 33 away from the body portion 31 into sealing engagement with the inner surfaces of the vertical side walls 27 and 28.

The innermost surfaces of the coils of the springs 36 are in contact with the outer surfaces of the lips 32. With continued compression of the springs 36 in contacting relation with the outer surfaces of the sealing lips 32, the latter lips are held or biased into sealing engagement with the outer periphery of the shaft 26. Upon operation of the shaft 26, centrifugal force developed by the rotation of the sealing member 30 with the shaft 26 functions to urge the lips 32 and 33 outwardly away from the shaft 26 as previously described. The springs 36 aid the action of centrifugal force to urge the lips 33 away from the shaft 26 and upon any radial outward movement of the lips 33 the springs 36 expand sufficiently to allow radial outward movement of the lips 32. Upon a reduction in speed of the shaft 26 and a lessening of centrifugal force, the springs 36 will be returned to their compressed state and function in this respect to urge or maintain the lips 32 in efficient sealing engagement with the shaft 26.

The main purpose of springs 36 is to maintain efficient sealing action during high speed operation of the shaft 26. In the event that the rubber material forming the seal 30 becomes set as a result of high temperature action, the resiliency of the springs 36 remains unaffected and functions to increase the sealing friction or engagement between the lips 33 and the inner surfaces of the walls 27 and 28 during high speed sealing operation. The seal 30 is provided with a metallic constricting ring 37 for the purpose previously described.

In Fig. 5 a sealing unit 38 is illustrated as being provided with a housing formed from radially directed rings 39 and 40 which define the radial side walls of the housing and which are interconnected at their outer peripheries by an axially extending ring 41. Within the housing is received a sealing member 42 in sealing engagement with the inner surfaces of the side walls 39 and 40 of the housing and the outer periphery of a shaft 43. The sealing member 42 is formed from a block-like body portion 44 having received thereabout a constricting metal ring 45 of the type previously described. The body portion 44 is provided with an inwardly directed pair of annular sealing lips 46 which are in engagement with the outer periphery of the shaft 43. The outermost surfaces of the sealing lips 46 are provided with grooves 47 which are defined as a result of the end portions of each of the sealing lips 46 being formed in a V-shape. Received within the grooves 47 are coil springs 48 which are placed under tension upon the mounting of the same and constantly urge the sealing lips 46 into sealing engagement with the shaft 43. Outwardly from the sealing lips 46 is a pair of outwardly divergent sealing lips 49 which are integral with the outer portion of the body portion 44. The innermost surfaces of the sealing lips 49 are provided with continuous grooves 50 having received therein coil springs 51. The springs 51 are mounted in a compressed state within the grooves 50 and function to constantly urge the sealing lips 49 in an outwardly direction into engagement with the inner surfaces of the side walls 39 and 40 of the housing. Thus the coil springs 48 and 51 function to urge their respective sealing lips into sealing engagement so as to provide the same with consistent resiliency in the event that the rubber or rubber-like material of the sealing member 42 becomes set by the action of high temperatures. The sealing unit 38 functions in the same manner as described in connection with the sealing unit of Figs. 1–3 and the coil springs forming a part thereof merely add to the inherent resiliency of the material of the sealing member 42.

Referring to Fig. 6, a sealing member 52 of slightly modified design for use in pressure systems is illustrated. The sealing member 52 has incorporated therein the same structural characteristics of the modified forms of sealing members described in connection with Figs. 1, 4 and 5 with the addition of a special pressure compensating feature. The sealing member 52 is received within axially spaced, radially directed ring members 53 which, in combination with an axially directed ring member 54, define a seal housing of the type previously described. The sealing member 52 is provided with a block-like body portion 55 having integrally formed therewith an inwardly directed pair of annular sealing lips 56 which are in engagement with the outer periphery of a shaft 57. Spaced outwardly from the sealing lips 56 is a further pair of outwardly divergent sealing lips 58 which are in engagement with the inner surfaces of the side walls 53 of the seal housing. The sealing lips 56 and 58 function in the manner previously described in connection with the pairs of sealing lips of the sealing members of Figs. 1, 4 and 5.

The outer annular portion of the seal body 55 is defined by an axially directed ring portion 59 which is formed integral with the body portion 55 from the material thereof. The axially directed portion 59 defines two oppositely directed annular ribs 60 which extend in an axial direction to an extent just short of contact with the opposed inner surfaces of the side walls 53 of the housing. When used in pressure operation, the sealing member 52 in response to pressure moving axially along the shaft 57 will tend to move toward one or the other of the side walls 53 depending upon the direction of pressure application. The ribs 60 function to maintain adequate centering of the sealing member 52 within its housing by abutting an inner surface of a side wall 53 in response to pressure forces. In this manner the sealing member 52 will be held centrally of its housing to an extent sufficient to allow continued efficient operation of the same. In other words, upon the application of pressure forces the sealing member 52 cannot be moved into tight engagement with one of the side walls 53 to an extent that the sealing lips 58 no longer function in the manner intended.

As illustrated, the axial dimension of the annular portion 59 is less than the internal axial width of the housing as measured between the inner surfaces of the side walls 53. Under normal pressure operation the sealing lips 58 will maintain centering of the sealing member 52 within its housing. The radial end faces of the ribs 60 will not normally be in running contact with the inner surfaces of the side walls 53 and, consequently, will not be subject to wear. Upon pressure operation, one of the ribs 60 will move immediately into engagement with its adjacent side wall 53 so as to maintain the necessary centering of the seal for efficient operation of the sealing lips 58. However, if desired, the axial dimensions of the annular portion 59 may be such that side wall contact is maintained at all times. Furthermore, it should be understood that the sealing lips 56 and 58 may be spring loaded as described in connection with the modifications of Figs. 4 and 5.

In order to provide the annular portion 59 and the ribs 60 defined thereby with the requisite rigidity, a constricting ring 61 of greater width than those previously described is used. It will be noted that in Fig. 6 the constricting ring 61 is of sufficient axial dimensions to extend beyond the radial side walls of the body portion 55.

Obviously many modifications and variations of the invention as hereinbefore set forth may be made without departing from the spirit and scope thereof, and therefore only such limitations should be imposed as are indicated in the appended claims.

I claim:

1. A self-compensating seal for use with a rotatable member to seal the surface of the same, said seal including a housing carrying a sealing member therein, said sealing member having a first inwardly directed flexible sealing lip which is free of said housing for engagement with the surface of said rotatable member in angular relation thereto, and a second inwardly inclined flexible sealing lip forming a part of said sealing member and in engagement with a radially directed surface of said housing, which latter surface is arranged for positioning in a radial plane relative to the longitudinal axis of said rotatable member, said lips extending freely from the remainder of said sealing member in at least substantially paralleling relation and to an extent to be substantially equally responsive to the action of centrifugal force during the use of said seal, which centrifugal force acts to flex said lips and reduce frictional engagement between said first lip and the surface of said rotatable member and increase frictional engagement between said second lip and the surface of said housing.

2. A self-compensating seal for use with a rotatable shaft, said seal including an annular housing of substantially U-shaped cross section adapted for fixedly mounting about said shaft in circumferentially spaced inwardly opening relation thereto, and an annular sealing member at least partially received in said housing, said sealing member including a body portion provided with circumferentially continuous radially inwardly inclined and radially spaced lips, the innermost of said lips being free of said housing for frictional sealing engagement with said shaft, the outermost of said lips being positioned in frictional sealing engagement with a radial surface of said housing, said lips extending free of said body portion and being flexible relative to said body portion in responsive relation to the action of centrifugal force upon the rotation of said sealing member by said shaft, which centrifugal force acts to at least substantially equally flex said lips and reduce the frictional engagement between said innermost lip and said shaft and increase the frictional engagement between said outermost lip and said housing.

3. A self-compensating seal for use with a rotatable member to seal the surface of the same, said seal including a housing carrying a sealing member therein, said seal including a housing carrying a sealing member therein, said sealing member having a first inwardly directed flexible sealing lip which is free of said housing for engagement with the surface of said rotatable member in angular relation thereto, and a second inwardly inclined flexible sealing lip forming a part of said sealing member and in engagement with a radially directed surface of said housing, which latter surface is arranged for positioning in a radial plane relative to the longitudinal axis of said rotatable member, said lips extending freely from the remainder of said sealing member in at least substantially paralleling relation and to an extent to be substantially equally responsive to the action of centrifugal force during the use of said seal, which centrifugal force acts to flex said lips and reduce frictional engagement between said first lip and the surface of said rotatable member and increase frictional engagement between said second lip and the surface of said housing, and resilient means acting on said lips to urge the same into sealing engagement.

4. A self-compensating seal for use with a rotatable shaft, said seal including an annular sealing member having a body portion of block-like cross section, the inner surface of said body portion having integrally formed therewith a first pair of divergent flexible lips directed inwardly toward the center of said member for frictional sealing engagement with a shaft, a second pair of divergent flexible lips integral with said body portion directed inwardly toward the center of said member and spaced outwardly of said first pair, and a seal housing in which said sealing member is received, said second pair of lips being in frictional engagement with opposed inner surfaces of said housing.

5. A self-compensating seal for use with a rotatable shaft, said seal including an annular sealing member having a body portion of block-like cross section, the inner surface of said body portion having integrally formed therewith a first pair of divergent flexible lips directed inwardly toward the center of said member for frictional sealing engagement with a shaft, a second pair of divergent flexible lips integral with said body portion directed inwardly toward the center of said member and spaced outwardly of said first pair, a constriction ring about the outer surface of said sealing member, and a seal housing in which said sealing member is received, said second pair of lips being in frictional engagement with opposed inner surfaces of said housing.

6. A self-compensating seal for use with a rotatable shaft, said seal including an annular sealing member having a body portion of block-like cross section, the inner surface of said body portion having integrally formed therewith a first pair of divergent flexible lips directed inwardly toward the center of said member for frictional sealing engagement with a shaft, a second pair of divergent flexible lips integral with said body portion directed inwardly toward the center of said member and spaced outwardly of said first pair, a seal housing in which said sealing member is received, said second pair of lips being in frictional engagement with opposed inner surfaces of said housing, and resilient means acting on said lips to urge the same into sealing engagement.

7. A self-compensating seal for use with a rotatable shaft, said seal including an annular sealing member having a body portion of block-like cross section, the inner surface of said body portion having integrally formed therewith a first pair of divergent flexible lips directed inwardly toward the center of said member for frictional sealing engagement with a shaft, a second pair of divergent flexible lips integral with said body portion directed inwardly toward the center of said member and spaced outwardly of said first pair, and a seal housing in which said sealing member is received, said second pair of lips being in frictional engagement with opposed inner surfaces of said housing, the innermost surface of each of said lips of said second pair having compressed spring means in engagement therewith and acting to urge said second pair of lips into sealing engagement with said housing, the innermost surfaces of said lips of said first pair being in engagement with said spring means.

8. A self-compensating seal for use with a rotatable shaft, said seal including an annular sealing member having a body portion of block-like cross section, the inner surface of said body portion having integrally formed therewith a first pair of divergent flexible lips directed inwardly toward the center of said member for frictional sealing engagement with a shaft, a second pair of divergent flexible lips integral with said body portion directed inwardly toward the center of said member and spaced outwardly of said first pair, and a seal housing in which said sealing member is received, said second pair of lips being in frictional engagement with opposed inner surfaces of said housing, each of said sealing lips having separate resilient means in engagement therewith to urge said lips into sealing engagement.

9. In a shaft housing having a rotatable shaft extending therethrough and being provided with a seal housing fixedly received therein against rotation and surrounding said shaft, the provision of an annular seal partially received in said seal housing and in sealing engagement with said shaft and said seal housing, said seal being formed from a body portion of substantial mass each side of which is provided with a pair of integral circumferentially continuous and radially spaced flexible sealing lips, each of said lips being outwardly directed and radially inwardly inclined toward the center of said seal to define on each side of said body portion a pair of freely flexible substantially parallel shaft and end-face sealing members, said shaft sealing members being in frictional sealing engagement with said shaft and causing said seal to rotate therewith within said seal housing, said end-face sealing members being in frictional sealing engagement with said seal housing and during the rotation of said seal being responsive to the action of centrifugal force to increase their frictional engagement with said seal housing, the centrifugal force acting on said shaft sealing members to reduce frictional engagement between the same and said shaft.

10. In a shaft housing having a rotatable shaft extending therethrough and being provided with a seal housing fixedly received therein against rotation and surrounding said shaft, the provision of an annular seal partially received in said seal housing and in sealing engagement with said shaft and said seal housing, said seal being formed from a body portion of substantial mass each side of which is provided with a pair of integral circumferentially continuous and radially spaced flexible sealing lips, each of said lips being outwardly directed and radially inwardly inclined toward the center of said seal to define on each side of said body portion a pair of freely flexible substantially parallel shaft and end-face sealing members, said shaft sealing members being in frictional sealing engagement with said shaft and causing said seal to rotate therewith within said seal housing, said end-face sealing members being in frictional sealing engagement with said seal housing and during the rotation of said seal being responsive to the action of centrifugal force to increase their frictional engagement with said seal housing, the centrifugal force acting on said shaft sealing members to reduce frictional engagement between the same and said shaft, and a constriction ring about the outer surface of said body portion.

11. In a shaft housing having a rotatable shaft extending therethrough and being provided with a seal housing fixedly received therein against rotation and surrounding said shaft, the provision of an annular seal partially received in said seal housing and in sealing engagement with said shaft and said seal housing, said seal being formed from a body portion of substantial mass each side of which is provided with a pair of integral circumferentially continuous and radially spaced flexible sealing lips, each of said lips being outwardly directed and radially inwardly inclined toward the center of said seal to define on each side of said body portion a pair of freely flexible substantially parallel shaft and end-face sealing members, said shaft sealing members being in frictional sealing engagement with said shaft and causing said seal to rotate therewith within said seal housing, said end-face sealing members being in frictional sealing engagement with said seal housing and during the rotation of said seal being responsive to the action of centrifugal force to increase their frictional engagement with said seal housing, the centrifugal force acting on said shaft sealing members to reduce frictional engagement with the same and said shaft, a constriction ring about the outer surface of said body portion, and resilient means acting on said lips to urge the same into sealing engagement.

12. A self-compensating seal for use with a rotatable shaft, said seal including an annular sealing member having a body portion of block-like cross section, the inner surface of said body portion having integrally formed therewith a first pair of divergent flexible lips directed inwardly toward the center of said member for frictional sealing engagement with a shaft, a second pair of divergent flexible lips integral with said body portion directed inwardly toward the center of said member and spaced outwardly of said first pair, the outer portion of said member being provided with oppositely and axially directed rib-like abutment means spaced outwardly of said second pair of lips, and a seal housing in which said sealing member is received, said second pair of lips being in frictional engagement with opposed inner surfaces of said housing and said rib-like abutment means being adapted for abutment with an inner surface of said housing upon axial movement of said member relative to said housing.

13. A self-compensating seal for use with a rotatable shaft, said seal including an annular sealing member having a body portion of block-like cross section, the inner surface of said body portion having integrally formed therewith a first pair of divergent flexible lips directed inwardly toward the center of said member for frictional sealing engagement with a shaft, a second pair of divergent flexible lips integral with said body portion directed inwardly toward the center of said member and spaced outwardly of said first pair, oppositely and axially directed ribs formed integral with said body portion and spaced outwardly of said second pair of lips, a constriction ring about the outer surface of said sealing member, and a seal housing in which said sealing member is received, said second pair of lips being in frictional engagement with opposed inner surfaces of said housing, said ribs being adapted to restrict axial movement of said member within said housing by abutment with opposed inner surfaces thereof.

References Cited in the file of this patent

FOREIGN PATENTS

| | | |
|---|---|---|
| 13,658 | Germany | May 9, 1956 |
| 578,526 | Great Britain | July 2, 1946 |
| 851,707 | Germany | Oct. 6, 1952 |
| 871,236 | Germany | Mar. 19, 1953 |